June 13, 1950     R. COVER     2,511,464
CORN EAR TRIMMER

Filed May 29, 1947     3 Sheets-Sheet 1

Inventor
Ralph Cover
Mason, Porter, Diller & Stewart
Attorneys

June 13, 1950  R. COVER  2,511,464
CORN EAR TRIMMER

Filed May 29, 1947  3 Sheets-Sheet 2

Inventor
Ralph Cover
By Mason, Porter, Diller, Stewart
Attorneys

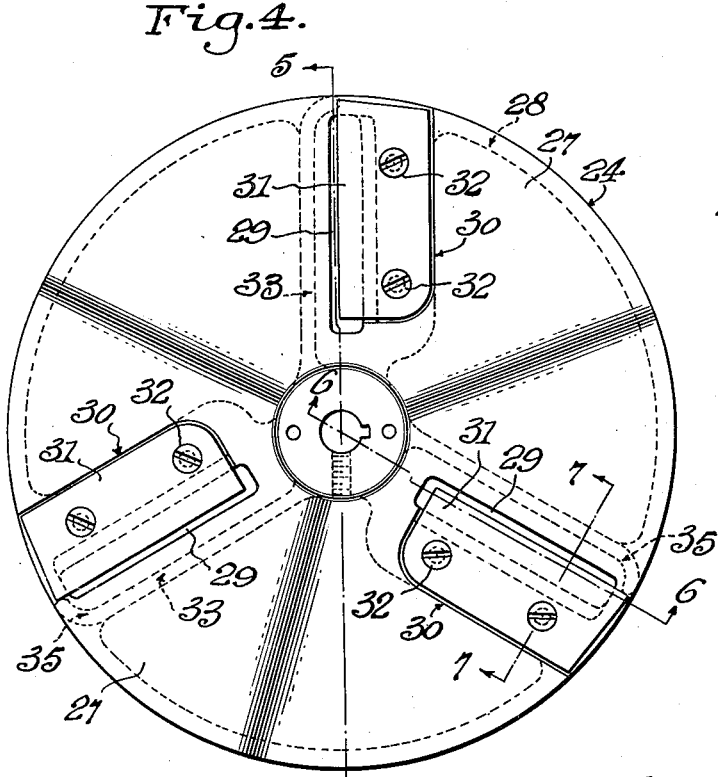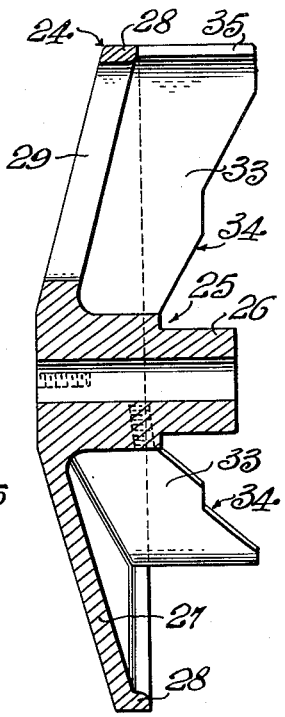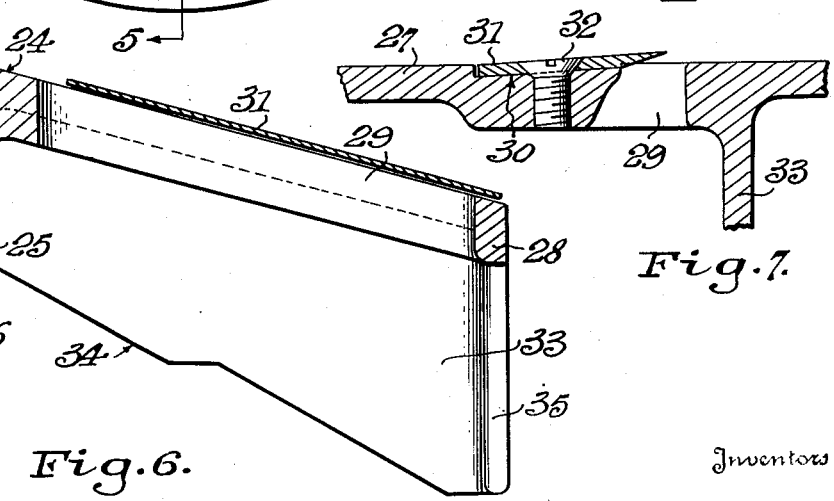

Patented June 13, 1950

2,511,464

UNITED STATES PATENT OFFICE 2,511,464

CORN EAR TRIMMER

Ralph Cover, Westminster, Md.

Application May 29, 1947, Serial No. 751,222

5 Claims. (Cl. 146—84)

The invention relates generally to the art of preparing corn for canning and it primarily seeks to provide a novel means for rapidly and efficiently trimming the ends of corn ears preparatory to the cutting of the kernels from the cobs.

In the processing of corn, as practiced at the present time, the ears of corn are debutted, husked, and have the kernels cut therefrom by machinery which operates effectively just as rapidly as the corn ears can be fed thereto. It very often happens that a considerable percentage of the corn ears to be processed will be below standard by reason of having bad ends, sometimes due to damage by crushing, but more often due to partial destruction by worms. Obviously such defective corn ears must be discarded in their entirety unless means is provided for removing the damaged or contaminated end portions of the ears with such efficiency and rapidity as will make the operation commercially feasible. It is a purpose of the present invention to provide such a means.

In its more detailed nature the invention resides in providing a novel corn ear trimming means of the character stated in which there are included a casing, a motor, a shaft driven by the motor and extending into the casing, and a rotor on the shaft within the casing and equipped with trimmer blades, the casing having an elongated throat or sleeve through which corn ears can be presented by hand to the trimmer blades and an outlet through which portions trimmed from the corn ears can be discharged.

An object of the invention is to provide a corn ear trimmer of the character stated in which the rotor is coniform in shape at the face to which the blades are affixed, and the casing is equipped with two elongated corn ear receiving or guiding throats or sleeves disposed at opposite sides of the rotor center and with their axes in diverging relation and each disposed approximately perpendicular to the side of the rotor onto which the respective sleeve or throat opens.

Another object of the invention is to provide a corn ear trimmer of the character stated in which the casing includes a hingedly mounted face plate on which the corn ear receiving and guiding sleeves or throats are mounted, and which is swingable away from its effective position to expose the whole of the trimmer blade carrying face of the rotor.

Another object of the invention is to provide a corn ear trimmer of the character stated in which the rotor is provided with a radially extending vane projection associated with each of the trimmer blade equipments, said vanes being effective to facilitate the discharging of the trimmings from the casing and also being so disposed as to create a partial vacuum behind each blade during rotation of the rotor effective to facilitate clearance of the trimmings through the openings in the rotor at the positions of the blades.

Another object of the invention is to provide a corn ear trimmer of the character stated in which the casing is equipped with a pair of corn ear receiving and guiding throats or sleeves disposed at each side of the coniform rotor face with the axes of the throats or sleeves of each pair bearing parallel relation one to the other and being approximately perpendicular to the side of the rotor onto which the respective throats open, thereby to bear diverging relation to the axes of the other pair of said throats or sleeves.

With the above and other objects in view that will hereinafter appear, the nature of the invention will be more clearly understood by reference to the following detailed description, the appended claims, and the several views illustrated in the accompanying drawings.

In the drawings:

Figure 4 is a face view of the rotor per se.

Figure 5 is a vertical cross section taken on the line 5—5 on Figure 4.

Figure 6 is a fragmentary cross section taken on the line 6—6 on Figure 4.

Figure 7 is a fragmentary cross section taken on the line 7—7 on Figure 4.

Figure 1:
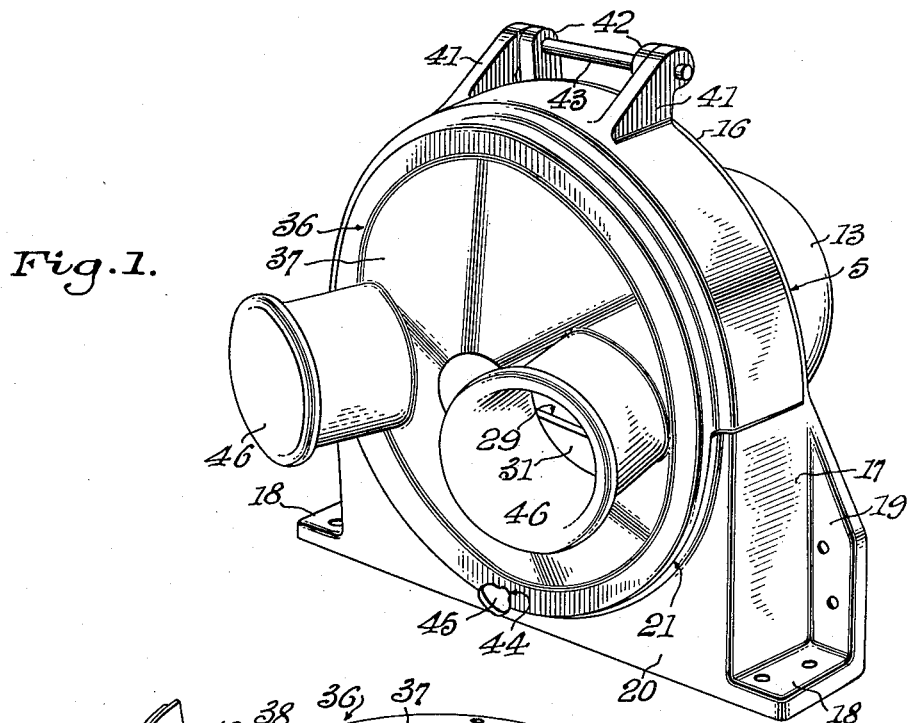
Figure 1 is a perspective view illustrating the invention, the cover being in the normal, effective position.

In the example of embodiment of the invention herein shown, the improved corn ear trimmer includes a casing having a main body portion wherein is embodied a back plate 5 which is forwardly dished as at 6 to provide a central coniform wall 7. The wall 7 is stepped at 8 and centrally thickened and provided with a rotor hub and shaft receiving bore 9 which is surrounded by a coniform wall extension 10.

The rear face of the back plate 5 is recessed as at 11 to receive the mounting flange 12 of a motor 13, the shaft of which projects forwardly through the plate bore 9. The motor preferably is secured on the casing by screws 15 which pass through the back plate and into the mounting flange 12 upon which the motor is supported.

The top portion of the back plate 5 is half circular in form as at 16, and the back plate joins upright side walls 17 which extend downwardly from a horizontal center line passing through the axis of the bore 9. The walls 17 merge into horizontal mounting feet 18 and upright, laterally extending mounting ears 19, either or both of which can be used for mounting the trimmer on a suitable support. The side walls 17 also merge into a front wall 20 which is provided with a half circular machined face 21 intended to define half of a rotor opening. At the bottom, the back plate 5, side walls 17 and front wall 20 cooperate to define a trimmings discharge opening 22. A threaded tap 23 at the central bottom portion of the front wall 20 serves a purpose that will be described hereinafter.

A rotor generally designated 24 and including a hub 25 is secured upon the motor shaft 14, preferably being keyed thereon. The rotor hub includes a reduced diameter portion 26 which is receivable in the back plate bore 9, and the body of the rotor is dished in the manner clearly illustrated in Figure 5 to provide a coniform outer or front face 27, and said rotor is provided at its periphery with a reinforcing edge flange 28. Radial, elongated openings 29 are provided through the face of the rotor 24, and each is flanked by an upwardly sloping recess 30 in which a trimmer blade is removably secured as at 32, each said blade extending slightly above and over the respective rotor opening 29 in the manner clearly illustrated in Figure 7.

Slightly in advance of each of the openings 29 the rotor 24 is provided with a vane extension 33 which parallels the opening in the manner clearly illustrated in Figure 4 and is shaped as at 34 to conform to and move in close proximity over the stepped coniform wall portion at the front of the back plate 5. The outer end of each vane extension 33 is curved in the trailing direction as at 35. See Figure 4.

A cover generally designated 36 is provided and includes a front plate 37 which is circular and equipped with a machined circular wall 38 disposed to contact the half circular face 21 of the main body casting and to form a continuation thereof. The upper half of the cover 36 is provided with a half circular side wall 39 which is rabbeted as at 40 to fit the opposing edge of the back plate 5 about the upper half thereof.

The cover side wall portion 39 is provided at its top portion with ear extensions 41 which cooperate with ears 42 extending from the back plate 5, and with a hinge pintle 43 extending through apertures in the ears, in providing a hinge mounting for the cover 36 on the main body casting.

Figure 2:
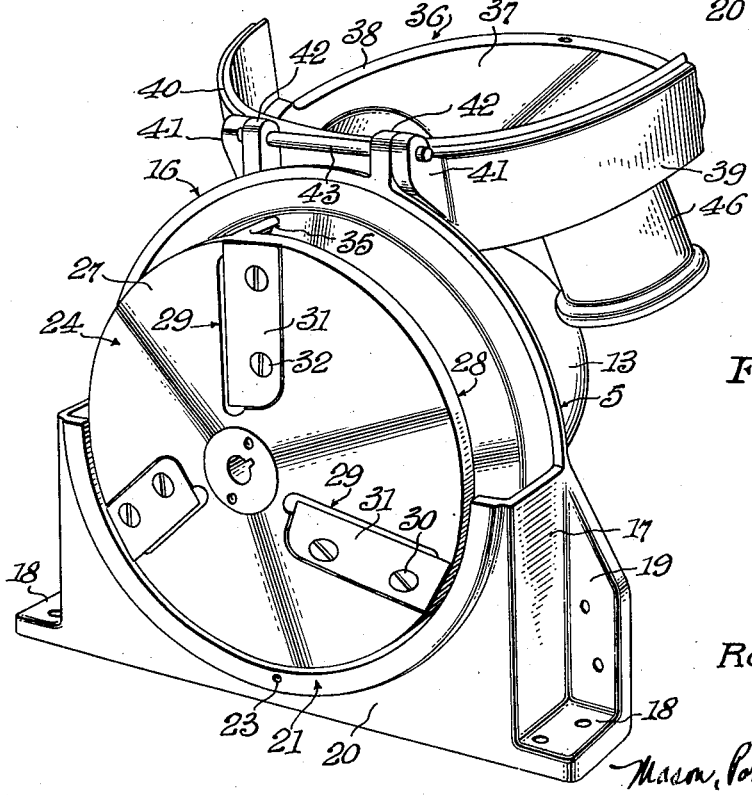
Figure 2 is a view similar to Figure 1 with the cover swung away to expose the trimmer blade bearing rotor.
Figure 3:
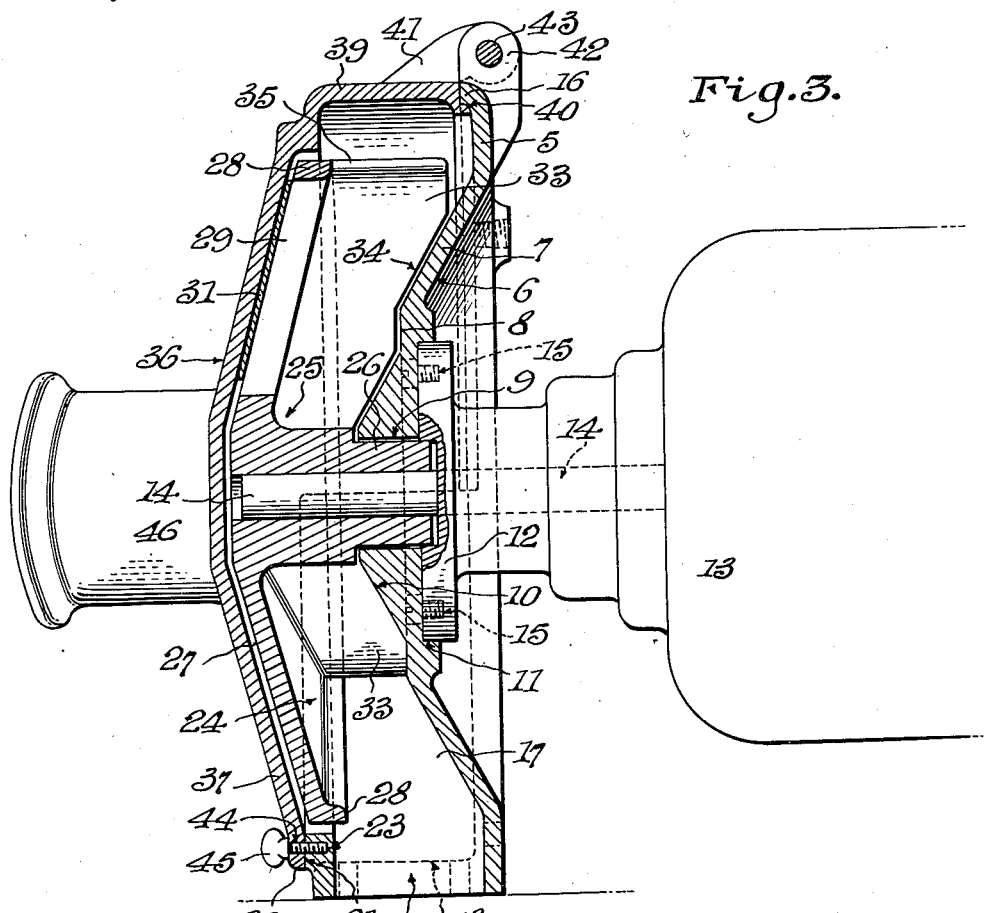
Figure 3 is a vertical cross section through the trimmer, the section being taken along the axis of the rotor.

A bore 44 is provided at the center bottom of the cover front plate 37, and said bore receives a thumb screw 45 which is threadable into the tapped hole 23 in the front wall 20 of the main body casting for removably securing the cover in the operative position illustrated in Figure 1. After removing the thumb screw 45, the cover plate may be swung from the operative position illustrated in Figure 1 to the out-of-the-way position illustrated in Figure 2 in which the whole of the trimmer blade bearing surface of the rotor 24 is exposed.

The front plate 37 of the cover 36 is shaped to conform to and fit closely over the front face of the rotor 24, and said front plate is provided with two elongated corn ear receiving throats or guide sleeves 46, one thereof being disposed at each side of the center of the plate with its axis perpendicular to the particular side face of the rotor onto which the particular throat or sleeve 46 opens. Because of the coniform shaping of the front face of the rotor 24 it will be apparent, especially by reference to Figure 8, that the throats or guide sleeves 46 diverge. By reason of this specific arrangement of the parts, best illustrated in Figure 8, it is possible for two persons to stand simultaneously before the trimmer and feed corn ears through the receiving throats or guide sleeves 46 and against the rapidly rotating cutter blades 31 without said persons interfering one with the other during the manipulation of the corn ears.

Figures 8, 9:
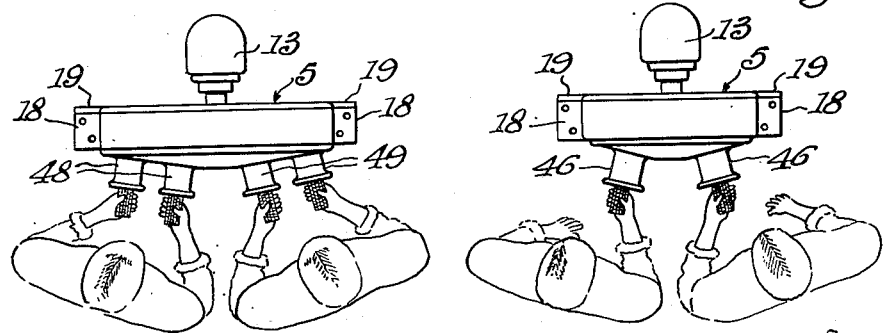
Figure 8 is a somewhat diagrammatic plan view illustrating the manner in which two persons can utilize the trimmer in the cleaning of corn ears without interference one with the other.
Figure 9 is a view similar to Figure 8 illustrating a modified form of the invention in which two corn ear receiving throats or guide sleeves are provided at each side of the center of the rotor so that two persons can simultaneously feed corn ears to the cleaning rotor with both hands without interference between said persons.

In Figure 9 of the drawings, there is illustrated a modified arrangement of the corn ear receiving throats or guide sleeves in which two pairs of corn ear receiving throats or guide sleeves 48—48 and 49—49 are provided, one said pair being placed at each side of the center of the cover plate with the axes of the throats or sleeves of each pair bearing parallel relation and being disposed perpendicular to the face of the rotor onto which the respective throats or sleeves open. It will be apparent by reference to Figure 9 that the axes of the throats or sleeves 48—48 diverge with respect to those of the throats or sleeves 49—49, thus making it possible for two persons to stand simultaneously before the trimmer and feed corn ears through the throat or sleeve pairs 48—48 and 49—49 against the rapidly rotating trimmer blade bearing rotor without interference one with the other.

By reason of the particular shaping and arrangement of the vane extensions 33, said extensions serve to greatly facilitate the discharging of the trimmings cut from the corn ears by the blades 31 out through the discharge opening 22 at the bottom of the trimmer housing. It will also be apparent that by reason of the placement of said vane extensions 33 parallel and slightly in advance of the openings 29, said extensions function during the rapid rotation of the rotor 24 to create a partial vacuum inwardly of or behind each blade 31 which is effective to facilitate clearance of the trimmings through the rotor openings 29 as the trimming or cutting action progresses.

While one form of the invention has been shown for purposes of illustration, it is to be clearly understood that various changes in the details of construction and arrangement of parts may be made without departing from the spirit and scope of the invention as defined in the appended claims.

I claim:

1. A corn ear trimmer of the character described comprising, a casing, a motor, a shaft horizontally disposed and driven by the motor and extending into the casing, and a rotor on the shaft within the casing and having a coniform surface equipped with trimmer blades, said casing including a cover portion closing over the trimmer blade bearing surface of the rotor and having a coniform portion closely overlying the blades and equipped with two elongated guide throats disposed in a common horizontal plane and through which corn ears can be presented endwise against said rotor surface, and an outlet through which portions trimmed from the corn ears by said blades can be discharged, said throats being disposed at opposite sides of the rotor center and having their axes in diverging relation and each approximately perpendicular to the rotor face surface onto which the particular throat opens.

2. A corn ear trimmer as defined in claim 1 in which the cover portion of the casing is hingedly mounted so as to be swingable away from its position over the trimmer blade bearing surface of the rotor to expose the whole of said rotor surface.

3. A corn ear trimmer as defined in claim 1 in which the rotor is provided with a generally radially extending opening therethrough under each blade and a vane projection extending in a generally radial direction in advance of each blade in the direction of rotation of the rotor and effective to facilitate the discharging of the trimmings through the discharge opening in the casing and also to create a partial vacuum behind each blade during rotation of the rotor which is effective to facilitate clearance of the trimmings through the openings in the rotor.

4. A corn ear trimmer of the character described comprising, a casing, a motor, a shaft horizontally disposed and driven by the motor and extending into the casing, and a rotor on the shaft within the casing and having a coniform surface equipped with trimmer blades, said casing including a cover portion closing over the trimmer blade bearing surface of the rotor and equipped with two pairs of elongated guide throats through which corn ears can be presented endwise against said rotor surface, and an outlet through which portions trimmed from the corn ears by said blades can be discharged, said pairs of throats being disposed in a common horizontal plane and at opposite sides of the rotor center with the axes of the throats of each pair bearing parallel relation one with the other and being approximately perpendicular to the side of the rotor onto which the respective throats open, thereby to bear diverging relation to the axes of the other pair of throats.

5. A corn ear trimmer of the character described comprising, a casing, a motor, a shaft horizontally disposed and driven by the motor and extending into the casing, and a coniform rotor on the shaft within the casing and having a surface equipped with trimmer blades, said casing including a coniform front portion closely overlying the trimmer blade bearing surface of the rotor and a rearwardly spaced generally coniform back portion spaced a greater distance from said front portion adjacent its periphery than adjacent its center and also a downwardly opening outlet through which portions trimmed from the corn ears by said blades can be discharged, and said casing front portion also including at least one elongated guide throat disposed with its axis approximately perpendicular to the rotor face surface onto which it opens, said rotor having a generally radially extending opening therethrough under each blade and a vane projection extending in a generally radial direction in advance of each blade and movable in and extending substantially the full distance across the chamber between said front and back casing portions.

RALPH COVER.

REFERENCES CITED

The following references are of record in the file of this patent:

UNITED STATES PATENTS

| Number | Name | Date |
|---|---|---|
| 405,909 | Rabe | June 25, 1889 |
| 502,527 | Olp | Aug. 1, 1893 |
| 561,054 | Jones | May 26, 1896 |
| 916,168 | Kellam | Mar. 23, 1909 |
| 1,017,586 | Petchuck | Feb. 13, 1912 |
| 1,247,460 | Sinclair | Nov. 20, 1917 |
| 1,351,357 | Turk | Aug. 31, 1920 |
| 1,566,464 | Caterson | Dec. 22, 1925 |
| 1,580,273 | Zvorias | Apr. 13, 1926 |
| 1,977,320 | McKinney | Oct. 16, 1934 |
| 2,312,612 | Wetmore | Mar. 2, 1943 |